(12) United States Patent
Fisher et al.

(10) Patent No.: US 12,129,602 B2
(45) Date of Patent: Oct. 29, 2024

(54) MULTI-FUNCTIONAL BARRIER COATING FOR MOLDED FIBER CONTAINERS

(71) Applicant: Appvion, LLC, Appleton, WI (US)

(72) Inventors: Mark R. Fisher, Appleton, WI (US); Nicholas J. Sortedahl, Appleton, WI (US)

(73) Assignee: Appvion, LLC, Appleton, WI (US)

( * ) Notice: Subject to any disclaimer, the term of this patent is extended or adjusted under 35 U.S.C. 154(b) by 229 days.

(21) Appl. No.: 17/688,282

(22) Filed: Mar. 7, 2022

(65) Prior Publication Data
US 2023/0279615 A1    Sep. 7, 2023

(51) Int. Cl.
| | |
|---|---|
| D21J 1/08 | (2006.01) |
| B65D 25/14 | (2006.01) |
| C09D 7/20 | (2018.01) |
| C09D 7/61 | (2018.01) |
| C09D 129/04 | (2006.01) |
| D21H 19/40 | (2006.01) |
| D21H 19/60 | (2006.01) |
| D21H 19/62 | (2006.01) |

(52) U.S. Cl.
CPC ............... D21J 1/08 (2013.01); B65D 25/14 (2013.01); C09D 7/20 (2018.01); C09D 7/61 (2018.01); C09D 129/04 (2013.01); D21H 19/40 (2013.01); D21H 19/60 (2013.01); D21H 19/62 (2013.01)

(58) Field of Classification Search
None
See application file for complete search history.

(56) References Cited

U.S. PATENT DOCUMENTS

| | | |
|---|---|---|
| 5,006,405 A | 4/1991 | Watkins et al. |
| 5,626,945 A | 5/1997 | Berzins et al. |
| 6,132,822 A | 10/2000 | Overcash et al. |
| 6,193,831 B1 | 2/2001 | Overcash et al. |
| 6,878,199 B2 | 4/2005 | Bowden et al. |
| 7,048,975 B1 | 5/2006 | Tojo et al. |

(Continued)

FOREIGN PATENT DOCUMENTS

| | | |
|---|---|---|
| EP | 515750 A2 | 12/1992 |
| WO | WO 2020/212873 | 10/2020 |
| WO | WO 2021/133760 | 7/2021 |

OTHER PUBLICATIONS

Wet Strength Resins and Their Application, Ch. 2, pp. 13-22, TAPPI Press, 1994. (Year: 1994).*

(Continued)

*Primary Examiner* — Dennis R Cordray
(74) *Attorney, Agent, or Firm* — Amundsen Davis, LLC

(57) ABSTRACT

Coating compositions are disclosed that can be applied to at least a food-facing surface of a molded fiber container to make the coated container suitable for applications involving long term storage of a dry or frozen food item combined with short term contact with the food item in a liquid or moist state. The coating compositions include carboxylated polyvinyl alcohol copolymer and a crosslinking resin that is epichlorohydrin-based and/or azetidinium-functionalized. The compositions can also include clay particles or other suitable fillers. After crosslinking and drying, the compositions form a thermoset barrier coating in which the polyvinyl alcohol is bonded to the crosslinker by a plurality of function groups including ester functional groups.

12 Claims, 2 Drawing Sheets

(56) References Cited

U.S. PATENT DOCUMENTS

| | | |
|---|---|---|
| 8,268,746 B2 | 9/2012 | Orihara et al. |
| 9,382,664 B2 | 7/2016 | White et al. |
| 10,087,584 B2 | 10/2018 | Chung et al. |
| 10,428,467 B2 | 10/2019 | Chung et al. |
| 2002/0012759 A1 | 1/2002 | Asayama et al. |
| 2020/0208353 A1 | 7/2020 | Chung et al. |
| 2020/0277738 A1 | 9/2020 | Chung et al. |
| 2020/0354602 A1* | 11/2020 | Wilke .................. C08K 5/0025 |
| 2022/0205184 A1* | 6/2022 | Spender ................ D21H 21/16 |

OTHER PUBLICATIONS

Barrisurf™ LX technical data sheet, Jul. 2019, 1 page.
Basic Physical Properties of PVOH Resin, Kuraray Co., Dec. 2020, 40 pages.
Chattopadhyay et al., "Synthesis of Azetidinium-Functionalized Polymers Using a Piperazine Based Coupler", Macromolecules, Jan. 17, 2013, pp. 638-646.
Kanda et al., "Structural analysis of cross-linked poly(vinyl alcohol) using high-field DNP-NMR", RSC Adv., vol. 10 (2020), pp. 8039-8043.
"Polycup 172 polymeric resin" product data sheet, Solenis, 2014, 2 pages.
"Polycup™ 2000 polymeric resin" product data sheet, Solenis, 2014, 2 pages.
"Polycup™ Crosslinking Resins" sell sheet, Ashland Inc., 2013, 2 pages.
Yang et al., "Switching off PAE wet strength", Nordic Pulp & Paper Research J. 2019, vol. 34(1), 2019, pp. 88-95.

\* cited by examiner

MULTI-FUNCTIONAL BARRIER COATING FOR MOLDED FIBER CONTAINERS

FIELD OF THE INVENTION

The present invention relates to molded fiber containers, and in particular to coatings for use with such containers, and such coated containers. The invention also pertains to related methods, systems, and articles.

BACKGROUND OF THE INVENTION

Molded plastic containers have long been used to hold food products. Examples of such containers include molded plastic plates, cups, bowls, clamshell packages, jugs, bottles, and the like, made from a variety of plastics such as polystyrene, polyester, polyethylene terephthalate (PET), and polyvinyl chloride (PVC). Techniques for molding such containers include injection molding, thermoforming, and blow molding. The plastic containers are often designed for single-use applications and, unless they are recycled, are simply discarded and eventually find their way from the waste stream to every corner of the globe.

"Molded fiber" containers, also referred to by terms such as fiber-formed, molded pulp, or molded fiber pulp, have grown in popularity as an alternative to plastics. The molded fiber containers are typically made from natural fibers and are thus recyclable, and biodegradable if discarded. Molded fiber containers have long been used as egg cartons and berry baskets. Molded fiber packing inserts are also now commonly used in shipping applications to hold solid objects—whether food objects such as bottles of wine, or non-food objects such as electronic devices—in place within a box, and to provide cushioning to prevent breakage during shipment.

SUMMARY OF THE INVENTION

One area in which molded fiber containers have not significantly replaced plastic containers is in certain applications wherein the container comes into contact with a liquid, moist, or wet food product.

Our particular focus is for applications where the container is suitable for long-term storage of the food product in a substantially dry or frozen state, followed by a short preparation process where the food product is moistened or wetted, and optionally heated or cooked, while in the container, such that a user may then eat the moistened, prepared food by scooping it out of the container spoonful-by-spoonful, or forkful-by-forkful, etc. The long-term storage may be for at least one month, and typically several months. The wetting or moistening step and optional cooking/heating step of the preparation process may last only a few minutes, typically less than one hour, and may involve adding water, milk, or other liquid(s) to the food product, and/or heating the food product whether from a frozen state or otherwise in a microwave oven or by other means, all while the food product remains inside and in contact with the container. We refer to these applications as long-term storage/short-term moist food contact (LTS/STMFC) applications. Examples include, but are by no means limited to, bowls, cups, or other vessels including trays or plates, for holding frozen vegetables or other frozen foods, dry noodles or pasta for ramen noodles or macaroni-and-cheese, oatmeal, cereals, single-serve meals, or the like.

We have developed new coating products that can be applied to molded fiber containers to make them suitable for LTS/STMFC applications, while not negatively impacting the recyclability or biodegradability of the container. The coatings can be applied to surface(s) of the container that would otherwise be in direct contact with the food product, in order to provide good water vapor barrier properties for long-term storage, prevent the food product from soaking through the fibrous wall of the container during the preparation process, and provide other benefits discussed below. Although the food product is then, strictly speaking, in direct contact with the thin barrier coating rather than the underlying surface of the molded fiber container, the coated container as so used is still considered for purposes of the present application to fall within the scope of an LTS/STMFC application.

The new coating products comprise as key ingredients polyvinyl alcohol (PVOH) and a crosslinking agent. However, we determined that in order to produce a coated container that meets all of our functional tests, ordinary PVOH, and ordinary crosslinking agents, are inadequate. In order for the finished coating to meet all of our functional goals (i.e., full functionality, or "multi-functional") and to be suitable for the intended applications, we found that the PVOH should be carboxylated, and the crosslinker should be one that is based on epichlorohydrin, and/or that includes an azetidinium functional group.

We have thus developed a new family of coating materials that can be applied to molded fiber containers to make them more suitable for use in LTS/STMFC applications.

We therefore disclose herein, among other things, liquid coating compositions that include a carboxylated polyvinyl alcohol (PVOH) copolymer, and a crosslinking resin that is epichlorohydrin-based, or azetidinium-functionalized, or both epichlorohydrin-based and azetidinium-functionalized. Clay particles may be dispersed throughout the coating composition. The carboxylated PVOH copolymer, the crosslinking resin, and the clay particles may together account for at least 90%, or at least 95%, or at least 98 or 99%, of the dry solids content of the coating composition. The coating composition may consist of, or consist essentially of, the carboxylated PVOH copolymer, the crosslinking resin, and the clay particles. A dry solids ratio of the carboxylated PVOH copolymer to the crosslinking resin may be in a range from 4:1 to 9:1, or it may be substantially 6:1. The carboxylated PVOH copolymer may be at least 88% hydrolyzed, or at least 98% hydrolyzed, or at least 99% hydrolyzed.

We also disclose methods that include providing a molded fiber container adapted for holding food, the container having a container wall having a first surface for facing the food, and applying a liquid coating composition as set forth herein to the container to provide a coating on the first surface, and drying the coating.

We also disclose articles that include a molded fiber container and a thermoset polymer coating layer. The molded fiber container may be adapted for holding food, the container having a container wall having a first surface for facing the food. The thermoset polymer coating layer may be applied to the first surface, and may completely cover the first surface. The coating layer includes a polyvinyl alcohol bonded to a crosslinker by a plurality of functional groups, including ester functional groups. Clay particles may be dispersed throughout the coating layer. The coating layer may consist of, or consist essentially of, the polyvinyl alcohol bonded to the crosslinker, and the particles. The article may exhibit a moisture vapor transmission rate (MVTR) of no more than 77 (g/m$^2$)/day. The plurality of functional groups may also include ether functional groups. The coating layer may have a coat weight of at least 5 g/m$^2$.

We also disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION OF ILLUSTRATIVE EMBODIMENTS

As noted above, we have discovered unique coating compositions for application to surfaces of molded fiber containers to make the resultant coated containers suitable for LTS/STMFC applications as described above. The coating compositions include carboxylated polyvinyl alcohol copolymer, and a crosslinking resin that is epichlorohydrin-based and/or azetidinium-functionalized. The compositions can also include clay particles or the like.

An objective of our work was to develop coatings that could be used to make molded fiber containers suitable for the types of direct food contact applications discussed above, which may involve a long-term storage capability and a short period of direct contact with a moistened (including wet or liquid) food product. As mentioned above, the container may be a bowl, cup, or other vessel including a tray or plate, for storing frozen foods, dry or dehydrated foods, or the like, and holding such foods after they have been wetted or moistened and optionally cooked or heated. Desirably, the coated container would provide sufficient vapor barrier properties to enable long-term storage of the food in a frozen or dry state, and no significant degradation such as by dissolving, flaking, chipping, etc. during microwave heating or other heating or cooking of the food, or if a user chooses to eat the food directly out of the container with a spoon, fork, knife, chopsticks, or other eating implement which could scrape or otherwise strike or contact the coated container wall. The finished coating thus desirably provides a multi-functional barrier including a water vapor barrier and a barrier between the food product and the molded fiber container wall.

Figure 1:
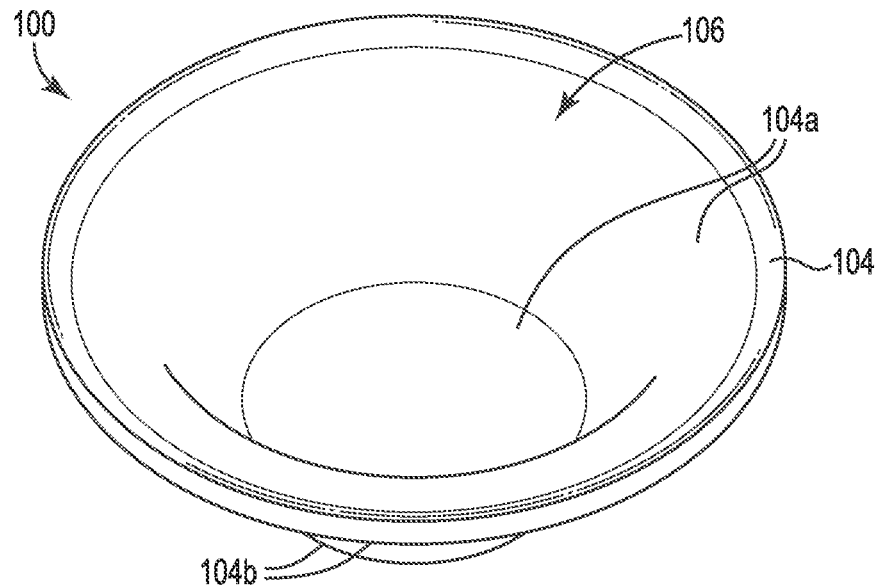
FIG. 1 is a perspective view of a molded fiber container.

FIG. 1 illustrates one example of a molded fiber container 100. The container 100 comprises a wall or walls 104, which are shaped and arranged to form a bowl, cup, or other rigid or semi-rigid shape suitable for carrying or holding food. The container 100 may be generally concave to define an interior space 106, where the liquid, moist, or wet food product is to be placed and held. The walls 104 have interior or inner surfaces 104a which face toward the interior space 106 and toward the food product, and exterior or outer surfaces 104b which face away from the interior space and away from the food product. The separation or distance between the interior and exterior surface defines the molded fiber wall thickness, which may be substantially uniform throughout the container 100, or it may be designed to have a greater thickness in some areas or locations than in others.

The container 100 may be of any conventional design or construction, provided it is of the type commonly known as "molded fiber", "molded pulp", or the like. Known molded fiber products suitable for use with the disclosed coatings include those known by the terms thick-walled, transfer molded, thermoformed, and processed. Suitable molded fiber products can be made using a single heated mold technique, or a multi-heated mold technique. The container or product may in any case comprise fibrous materials such as natural fibers, wood fibers, or recycled paper or cardboard. As such, the container 100 is preferably fully biodegradable and compostable. The molding process used to make the container may in some cases yield an inner surface 104a that is much smoother than the outer surface 104b, while in other cases the inner and outer surfaces may have substantially the same degree of roughness or smoothness.

Figure 2:
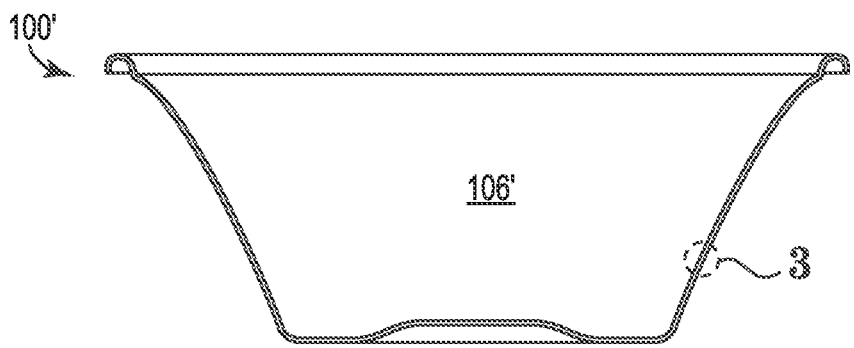
FIG. 2 is a schematic cross-sectional view of the container of FIG. 1 but with the addition of a barrier coating that covers interior-facing surfaces of the container.
Figure 3:
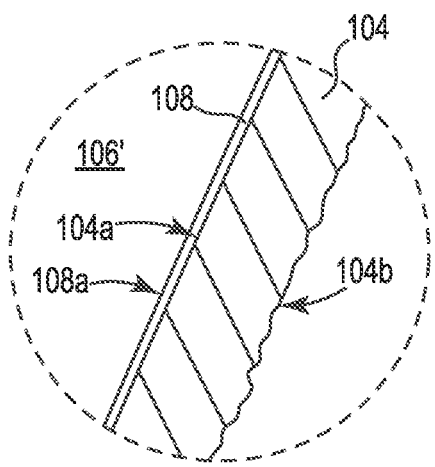
FIG. 3 is a magnified schematic view of a portion of the container wall of FIG. 2, showing the coating applied to an interior-facing or food-facing surface of the wall.

FIG. 2 is a schematic cross-sectional view of the container of FIG. 1, but after a barrier coating such as described herein has been applied to the inner surfaces, and cured to form a thermoset polymer coating layer. Thus, the resulting coated container is identified by reference numeral 100', where the prime superscript is used to indicate the container differs from the uncoated container 100 of FIG. 1 by the addition of the barrier coat. The interior space is labeled 106', where the prime superscript indicates the space differs slightly from the space 106 of FIG. 1 due to the addition of the barrier coat. A magnified view of a portion of the coated wall of coated container 100' is shown in FIG. 3. In the figure, the inner surface 104a of the molded fiber wall 104 is shown as being smoother than the outer surface 104b of the wall 104, but in alternative embodiments the inner and outer surfaces may be substantially equally smooth or rough.

A barrier coat or coating 108 covers at least the inner surface 104a, but may also cover other surfaces of the container, including in some cases some or all of the outer surface 104b, or even all exposed surfaces of the container. The barrier coat 108 is made by applying a thin layer of liquid coating composition to the inner surface 104a of the container 100, and to other surfaces if desired, and then drying and curing the thin liquid coating. Application can be made by spray coating, dip coating, or any other suitable coating method. The coating may be applied in any suitable thickness provided it is thick enough to achieve the desired barrier properties. A typical thickness may be at least 5 g/m$^2$, or in a range from 5 to 15 g/m$^2$, or from 8 to 12 g/m$^2$. In most cases, the coating thickness is substantially uniform across the interior surfaces of the container or otherwise across the areas of the container to be coated.

The cured barrier coat 108 provides an inner or food-facing surface 108a, which is designed to come into direct contact with the food item when the food item is placed in the interior space 106'. Desirably, the barrier coat 108 serves as a barrier for grease or the like from migrating from the food to the molded fiber wall 104, while simultaneously also avoiding dissolving or flaking off into the food item. The barrier coat 108 also preferably serves as an effective water vapor barrier to promote long term storage of foods that may be either in a frozen state or a dry state.

Figure 4:
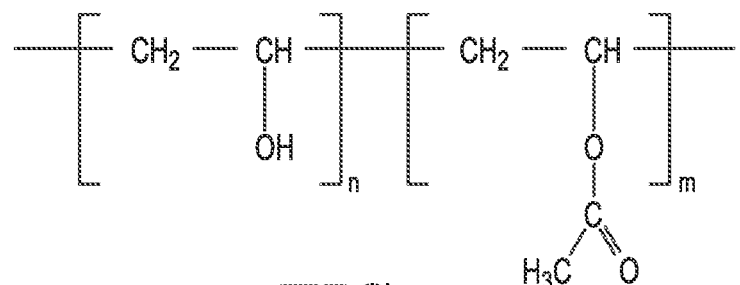
FIG. 4 is a representative chemical formula for polyvinyl alcohol.

The composition of the coating 108, and of its precursor liquid coating composition, is key to its successful implementation with fiber molded containers for LTS/STMFC applications. In that regard, we found that polyvinyl alcohol (PVOH)-based coatings can achieve such success, but only if the PVOH is carboxylated. Reference in that regard is directed to FIGS. 4 and 5. FIG. 4 depicts a representative, simplified chemical formula for commercially available PVOH. The formula consists of a PVOH monomer of mole percent n, and a vinyl acetate monomer of mole percent m, where n+m=100, and n and m are non-zero, and n can range from 88 to about 100. The degree of hydrolysis of the commercial PVOH is determined by how large n is, or how small m is. Commercial PVOH is said to be "partially hydrolyzed" if n is from 88 to 98, "fully hydrolyzed" if n is from 98 to 99, and "super hydrolyzed" if n is greater than 99.

Figure 5:
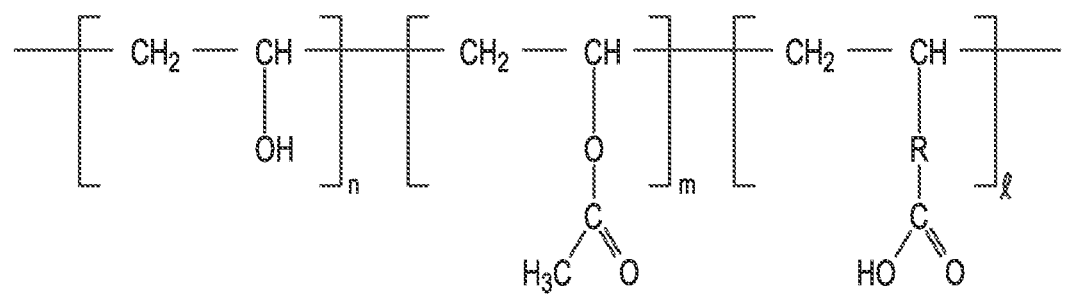
FIG. 5 is a representative chemical formula for carboxylated polyvinyl alcohol.

FIG. 5 depicts a representative, simplified chemical formula for commercially available carboxylated PVOH. Here, we see a copolymer that consists of a PVOH monomer of mole percent n, a vinyl acetate monomer of mole percent m, and a carboxylic acid monomer of mole percent l (script lowercase L), where n+m+l=100, and n, m, and l are all non-zero. The presence of the carboxylic acid monomer means that the commercial PVOH represented by this formula is carboxylated. As demonstrated further below in the Examples section, our investigation showed that the PVOH for the coating needs to be carboxylated in order for the coating composition to provide a barrier coating that provides the full functionality to satisfy our operative goals for LTS/STMFC applications. We found that partially hydrolyzed, fully hydrolyzed, and super hydrolyzed carboxylated PVOH are all suitable to provide such full functionality.

Figure 6:
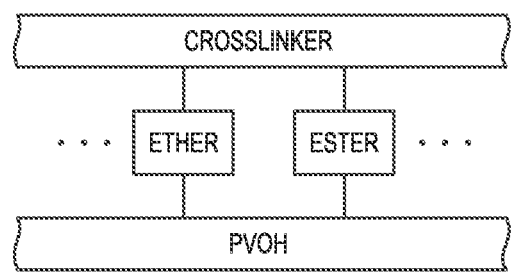
FIG. 6 is a schematic representation of the chemical components and bonds that are present in the disclosed coatings after crosslinking or drying.

The preferred coating composition also includes a crosslinker (crosslinking agent). In that regard, we found that although many different types of crosslinkers can be used with the carboxylated PVOH copolymer to form a coating that appears to be suitable as a barrier coating, only certain crosslinkers produce a barrier coating that provides the full functionality to satisfy our operative goals for LTS/STMFC applications. In order to satisfy such goals, the crosslinker should be one that is based on epichlorohydrin, and/or that includes an azetidinium functional group. Examples that are both based on epichlorohydrin and that include an azetidinium functional group include Polycup™ 172, Polycup™ 2000, Polycup™ 8210, and Polycup™ 9200 polymeric crosslinking resins, available from Solenis LLC of Wilmington, Delaware. When such a crosslinker is used, the finished, crosslinked barrier coat is characterized by a chemical bonding arrangement substantially as shown in simplified fashion in FIG. 6, where the PVOH is chemically bonded to the crosslinker by not only ether functional groups, but also ester functional groups.

Our investigation of coating compositions also determined the dry solids ratio of the carboxylated PVOH copolymer to the crosslinking resin may ideally be approximately 6:1, or in a range from 4:1 to 9:1.

Besides the carboxylated PVOH copolymer and the appropriate crosslinking resin, it can also be helpful for purposes of tailoring the viscosity, thickness, or other rheological properties of the liquid coating composition and/or the finished barrier coating to include inert particles in the coating formulation. Clay particles, which advantageously are compatible for use in direct food applications, are particularly useful for this purpose. Preferably, such particles are selected to maintain low coating porosity. We have found coating compositions that consist of, or consist essentially of, the carboxylated PVOH copolymer, the crosslinking resin, and the clay particles to provide exemplary results. In some cases, a limited amount of other inert particles or other materials can be added the composition, provided such other particles or materials are suitable and/or approved for direct food contact applications. Desirably, the carboxylated PVOH copolymer, the crosslinking resin, and the clay particles together account for at least 90%, or at least 95%, or at least 98 or 99%, of the dry solids content of the coating composition.

Turning again now to the aspirational functional goals discussed above, we selected a set of specific design goals or tests for the finished, coated container which we consider to be highly desirable—or even necessary in some cases, depending on the specific end use—for a coated molded fiber container to meet or pass in order to qualify as suitable for LTS/STMFC applications. The design goals are in the areas of (1) oil and grease resistance, (2) hot water resistance, (3) wet scuff resistance, and (4) moisture vapor transmission rate (MVTR). Finished coatings having acceptable functionality in most or all of these areas can protect the molded fiber container wall from negative influences of the wet/moist food product while also avoiding substantial contamination of the food by the coating, and can be referred to as multi-functional barrier coatings. The finished coating, and indeed the coated container, also desirably meets all relevant government rules and regulations, such as those of the U.S. Food and Drug Administration (FDA) pertaining to direct food applications.

Oil and grease resistance refers to the ability of the barrier coating to prevent oil and grease from migrating through the barrier coating and penetrating or soaking the molded pulp layer. In a specific test, the barrier coating is applied to at least the inside surfaces of a molded fiber container (i.e., those surfaces that would otherwise come into contact with the wet/moist food product), and allowed to thoroughly dry and cure. Liquid vegetable oil, such as Crisco™ brand pure vegetable oil or the like, is then applied to the coated surface such as by filling the coated container with the vegetable oil, and allowed to sit at room temperature for a specified time. If the barrier characteristics of the coating are inadequate at any given location or point on the coated container, some of the oil will migrate through the coating and soak into the molded fiber wall, producing a visibly darkened appearance centered at that point and slowly spreading outward. The test is considered a success if no more than a specified percentage of the surface area in contact with the vegetable oil is darkened.

Hot water resistance refers to the ability of the barrier coating to prevent hot water, such as boiling water, from removing, damaging, or solubilizing the barrier coating, to ensure the barrier coating avoids substantially contaminating the food product under such conditions. In a specific test, an isolated piece of the cured barrier coating is obtained by applying the liquid coating composition to a low adhesion surface such as a plastic substrate, and then allowed to thoroughly dry and cure. The cured barrier coating, which may be in the form of a flat, thin disk, is then separated from the low adhesion surface to provide a thin disk or piece of the cured barrier coating by itself. The piece of cured coating is weighed and then: placed into boiling water for a specified time, allowed to cool to room temperature, washed with deionized water, and thoroughly dried until it achieves a stable, final weight. Any loss in mass between the initial weight and the final weight represents the amount of the barrier coating that dissolved or was otherwise removed in the hot water. The test is considered a success if the loss in mass is no greater than a predetermined percentage.

Wet scuff resistance refers to the ability of the barrier coating to withstand exposure to hot water combined with abrasion by a metal implement such as a spoon or fork, e.g. as would be experienced by a user who heats the food in the container and scoops the food out of the container with a spoon or fork. The purpose of this test is also to ensure the barrier coating avoids substantially contaminating the food product, under these conditions. In a specific test, the barrier coating is applied to a substantially flat surface of a molded fiber substrate, and allowed to thoroughly dry and cure. The flat coated substrate is then placed into boiling water for a specified time, removed from the boiling water, and placed on an automated abrasion testing instrument, such as the Sutherland™ 2000 Rub Tester (available from Danilee Co., LLC, Medina, Ohio), with a conventional metal spoon affixed to the scuff plate. The settings on this Sutherland™ tester may be a speed setting of 42 cycles per minute and a weight of 2.0 pounds. After a specified number of passes of the spoon across the sample in contact with the barrier coating, the sample is dried, and sunflower oil or another suitable vegetable oil is placed on the barrier coating in the areas where the spoon scraped across the sample. If the action of the spoon damaged or otherwise compromised the barrier coat, the oil would pass through to the underlying fiber formed substrate, appearing as a dark spot or spots. The test is considered a success if no darkened areas are observed.

Moisture vapor transmission rate (MVTR) is a known testing parameter that measures how many grams of water vapor migrate through a given area of a sample in a given period of time, and is often expressed in units of $(g/m^2)/day$, i.e., $(g/m^2)/24$ hrs. In a specific test, a flat, barrier coated-sample as described above in the wet scuff resistance test is prepared and measured for MVTR, e.g. using a Mocon™ WVTR Permeation Analyzer at settings of 23 degrees C. and 50% RH. The test is considered a success if the measured MVTR is no more than a specified threshold, such as 77 $(g/m^2)/day$.

EXAMPLES AND COMPARATIVE EXAMPLES

In accordance with the foregoing teachings, a number of examples and comparative examples were made and tested.

The following polyvinyl alcohol (PVOH) products were used as described further below:

PVOH 1 was a super hydrolyzed, medium viscosity PVOH, product code SELVOL 125 from SEKISUI Specialty Chemicals America;

PVOH 2 was a carboxylated, fully hydrolyzed, medium viscosity PVOH, product code GOHSENX T-350 from MITSUBISHI Chemical Corporation;

PVOH 3 was a carboxylated, partially hydrolyzed, medium viscosity PVOH, product code POVAL 25-88KL from KURARAY Company Ltd.;

PVOH 4 was a partially hydrolyzed, high viscosity PVOH, product code POVAL 100-88 from KURARAY Company Ltd.;

PVOH 5 was a super hydrolyzed, medium viscosity PVOH, product code EXCEVAL HR-3010 from KURARAY Company Ltd.;

PVOH 6 was a fully hydrolyzed, medium viscosity PVOH, product code SELVOL 325 from SEKISUI Specialty Chemicals America; and PVOH 7 was a carboxylated, super hydrolyzed, medium viscosity PVOH, product code GOHSENX T-330H from MITSUBISHI Chemical Corporation.

Note that only three of these products—PVOH 2, PVOH 3, and PVOH 7—comprise carboxylated PVOH. These different PVOH products were used to prepare seven different liquid coating compositions. Each of these coating compositions used the following recipe: (1) the particular PVOH product; (2) Polycup™ 172 polymeric crosslinking resin, from Solenis LLC of Wilmington, Delaware, which crosslinker is based on epichlorohydrin and includes an azetidinium functional group; and (3) clay particles, in particular kaolin particles having a shape factor of very platy and particle size less than 2 micrometers, sold as Barrisurf™ LX by Imerys, Roswell, Georgia. In each case, the PVOH component was provided as a 10% aqueous solution, the crosslinker component was provided as a 12.5% aqueous solution, and the clay component was provided as a 44% aqueous solution. Also in each case, the coating composition comprised 80.2 parts by weight of the PVOH component, 10.7 parts by weight of the crosslinker component, and 9.1 parts by weight of the clay component. Each sample had a dry solids ratio of PVOH to the crosslinker component of 6:1.

In each case, the coating was applied to the inside surface of a molded fiber bowl at a coating thickness of 7 $g/m^2$, and allowed to dry and cure. After drying, the coating formed a thermoset polymer barrier coating.

The resulting coated molded fiber articles were tested in each of the four performance areas listed above. For the oil/grease resistance test, the specified time for the liquid vegetable oil to contact the coated surface was 3 minutes, and the specified percentage (surface area) for considering the test a success was 2%. For the hot water test, the specified time for the coated sample to be placed in boiling water was 4 minutes, and the criterion for success was less than a 10% loss in mass of the coating sample. For the Wet scuff resistance test, the specified time for the coated sample to be placed in boiling water was 4 minutes, and the specified number of passes of the spoon across the sample was 10. In the MVTR test, the specified threshold for considering the test a success was 77 $(g/m^2)/day$.

The results of the tests on Examples 1, 2, and 3 are given in Table 1 below. The results of the tests on Comparative Examples 1, 2, and 3 are given in Table 2 below.

TABLE 1

Test Results on Examples

| Sample name | PVOH component | oil/grease test | hot water test | wet scuff test | MVTR test |
| --- | --- | --- | --- | --- | --- |
| Ex 1 | PVOH 2 | pass | pass | pass | pass |
| Ex 2 | PVOH 3 | pass | pass | pass | pass |
| Ex 3 | PVOH 7 | pass | pass | pass | pass |

TABLE 2

Test Results on Comparative Examples

| Sample name | PVOH component | oil/grease test | hot water test | wet scuff test | MVTR test |
| --- | --- | --- | --- | --- | --- |
| Comp. Ex 1 | PVOH 1 | pass | fail | fail | pass |
| Comp. Ex 2 | PVOH 4 | pass | fail | fail | pass |

TABLE 2-continued

Test Results on Comparative Examples

| Sample name | PVOH component | oil/grease test | hot water test | wet scuff test | MVTR test |
|---|---|---|---|---|---|
| Comp. Ex 3 | PVOH 5 | pass | fail | fail | pass |
| Comp. Ex 4 | PVOH 6 | pass | fail | fail | pass |

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

We claim:

1. A liquid coating composition, comprising:
a carboxylated polyvinyl alcohol (PVOH) copolymer;
an epichlorohydrin-based crosslinking resin; and
clay particles dispersed throughout the coating composition;
wherein the carboxylated PVOH copolymer, the crosslinking resin, and the clay particles together account for at least 90% of a dry solids content of the composition, and
wherein the composition consists essentially of the carboxylated PVOH copolymer, the crosslinking resin, and the clay particles.

2. The composition of claim 1, wherein the carboxylated PVOH copolymer, the crosslinking resin, and the clay particles together account for at least 95% of the dry solids content of the composition.

3. The composition of claim 1, wherein the composition consists of the carboxylated PVOH copolymer, the crosslinking resin, and the clay particles.

4. The composition of claim 1, wherein a solids ratio of the carboxylated PVOH copolymer to the crosslinking resin is in a range from 4:1 to 9:1.

5. The composition of claim 4, wherein the solids ratio is substantially 6:1.

6. A method, comprising:
providing a molded fiber container adapted for holding food, the container having a container wall having a first surface for facing the food;
applying the liquid coating composition of claim 1 to the container to provide a coating on a first surface area; and
drying the coating.

7. A liquid coating composition, comprising:
a carboxylated polyvinyl alcohol (PVOH) copolymer;
an azetidinium-functionalized crosslinking resin; and
clay particles dispersed throughout the coating composition;
wherein the carboxylated PVOH copolymer, the crosslinking resin, and the clay particles together account for at least 90% of a dry solids content of the composition, and
wherein the composition consists essentially of the carboxylated PVOH copolymer, the crosslinking resin, and the clay particles.

8. The composition of claim 7, wherein the carboxylated PVOH copolymer, the crosslinking resin, and the clay particles together account for at least 95% of the dry solids content of the composition.

9. The composition of claim 7, wherein the composition consists of the carboxylated PVOH copolymer, the crosslinking resin, and the clay particles.

10. The composition of claim 7, wherein a solids ratio of the carboxylated PVOH copolymer to the crosslinking resin is in a range from 4:1 to 9:1.

11. The composition of claim 10, wherein the solids ratio is substantially 6:1.

12. A method, comprising:
providing a molded fiber container adapted for holding food, the container having a container wall having a first surface for facing the food; and
applying the liquid coating of claim 7 to the container to provide a coating on the first surface; and
drying the coating.

* * * * *